United States Patent [19]

Manabe et al.

[11] 4,276,363

[45] Jun. 30, 1981

[54] PROCESS FOR FORMING PHOSPHOR SCREENS WITH TREATED PHOSPHORS

[75] Inventors: Toshikatsu Manabe, Ome; Saburo Nonogaki; Hajime Morishita, both of Tokyo; Shoichi Uchino, Hachioji; Yoshifumi Tomita, Mobara; Masahiro Nishizawa, Mobara; Hiroshi Yokomizo, Mobara; Susumu Ohmatoi, Fujisawa, all of Japan

[73] Assignees: Hitachi, Ltd.; Kasei Optonix, Ltd., both of Tokyo, Japan

[21] Appl. No.: 86,445

[22] Filed: Oct. 19, 1979

[30] Foreign Application Priority Data

Oct. 25, 1978 [JP] Japan .................. 53-130523

[51] Int. Cl.$^3$ .................. G03C 5/00; B05D 5/06
[52] U.S. Cl. .................. 430/28; 427/64; 427/68; 430/29; 430/143; 430/144
[58] Field of Search .................. 427/64, 68, 54.1; 430/23, 28, 29, 143, 144; 252/301.16, 301.33

[56] References Cited

U.S. PATENT DOCUMENTS

| | | | |
|---|---|---|---|
| 2,929,708 | 3/1960 | Straw | 430/28 |
| 3,607,371 | 9/1971 | Haynes et al. | 427/68 X |
| 3,676,177 | 7/1972 | Hammond et al. | 427/68 X |
| 3,707,396 | 12/1972 | Patel | 427/68 |
| 4,128,674 | 12/1978 | Hedler | 427/68 X |

FOREIGN PATENT DOCUMENTS

| | | |
|---|---|---|
| 49-43075 | 11/1974 | Japan . |
| 49-43076 | 11/1974 | Japan . |
| 53-126861 | 12/1978 | Japan . |
| 1103864 | 2/1968 | United Kingdom . |

*Primary Examiner*—Ward C. Kimlin
*Attorney, Agent, or Firm*—Craig and Antonelli

[57] ABSTRACT

A process for forming a phosphor screen of a color picture tube comprising forming a thin layer using a photosensitive composition which contains an aromatic diazonium salt as a photosensitive component and produces tackiness by exposure to actinic light on the surface of the substrate and contacting the tackified thin layer after exposure to light with phosphor particles to form each phosphor layer for emitting color is improved by using as the phosphor particles those coated with at least one surface coating material selected from the group consisting of $Zn(OH)_2$, $Zn_3(PO_4)_2$ and $AlPO_4$ in shortening the contact time between the thin layer and the phosphor particles.

22 Claims, No Drawings

PROCESS FOR FORMING PHOSPHOR SCREENS WITH TREATED PHOSPHORS

This invention relates to a process for forming phosphor screen of a color picture tube.

On the inner surface of the image area (face plate) of a color picture tube, there are coated in the form of dots or stripes three kinds of phosphors, i.e. red-emitting, green-emitting and blue-emitting phosphors. A conventional process for forming the phosphor coated layer is as follows. In the first place, a layer of a mixture of a first color-emitting phosphor and a photosensitive resin is formed on the inner surface of the face plate. As the photosensitive resin, polyvinyl alcohol is usually used together with ammonium dichromate as a mixture thereof. This layer is usually formed by coating a mixture of a suspension of the photosensitive resin and the phosphor on the inner surface of the face plate and drying it. In the next place, the resulting layer is irradiated with ultraviolet light through holes of a shadow mask. Portions at which ultraviolet light is to be irradiated are portions at which electron beams are to be impacted for emitting colors from the phosphors, that is, portions to which the phosphors should be adhered. The photosensitive resin on the portions which are irradiated with ultraviolet light is insolubilized and by this the entire layer on the portions is insolubilized. Subsequently the layer is washed with a solvent (usually with water) to retain the insolubilized portions irradiated with ultraviolet light on the face plate and to remove the other portions of the layer by dissolving them. The same procedures as mentioned above are repeated for a second color-emitting phosphor and a third color-emitting phosphor.

As is clear from the above explanation, the process for forming the phosphor screen of a color picture tube is complicated and requires a plurality of repetitions of wet coating, washing with water and drying, so that simplification of the process has long been desired.

In order to simplify the conventional process for forming the phosphor screen of a color picture tube, some of the inventors of this invention have proposed a very simplified process as disclosed in Japanese Patent Appln Kokai (Laid-Open) No. 126861/78. Said process was accomplished based on novel finding that a photolysis product of an aromatic diazonium salt has receptive ability for powder (e.g. phosphor) particles. In processes for forming imagewise phosphor coated layers on the surface of substrates, said process is characterized by comprising (1) a first step of coating a photosensitive composition containing an aromatic diazonium salt or a mixture of an aromatic diazonium salt as a photosensitive component and producing tackiness by exposure to actinic light on the surface of the substrate to form a thin layer, (2) a second step of conducting imagewise exposure to actinic light of the thin layer to produce tackiness on the portions exposed, and (3) a third step of contacting the exposed thin layer with powder (phosphor) particles so as to make the thin layer receive the powder (phosphor) particles depending on receptive ability for powder of the thin layer. Therefore, according to said process, once the above-mentioned thin layer is formed three kinds of phosphor layers can be formed only by repeating three times actinic light irradiation and contact with phosphors.

But according to said process, when ordinary phosphors were used, it was difficult to adhere a sufficient amount of phosphors uniformly to the thin layer if the contact time was short and thus a considerable long time of the contact was necessary. And also it gives rise to various technical problems such as cross contamination of phosphor, fluidization of phosphor particles, fog of unexposed areas, etc.

On the other hand, the following references are also known to show the state of the art: i.e. British Pat. Nos. 1,103,864 and 1,103,865.

It is an object of this invention to provide an improved process for forming the phosphor screen of a color picture tube. It is another object of this invention to provide a process for forming the phosphor screen in a short time. Further objects and advantages of this invention will be apparent to one skilled in the art from the accompanying disclosure and discussion.

This invention provides a process for forming a phosphor screen of a color picture tube comprising coating a photosensitive composition, which contains an aromatic diazonium salt or a mixture of an aromatic diazonium salt as a photosensitive component and produces tackiness by exposure to actinic light, on the surface of the substrate to form a thin layer, exposing the thin layer imagewisely to actinic light for producing tackiness on the portions exposed, contacting the exposed thin layer with phosphor particles, and making the thin layer receive the phosphor particles depending on powder receptive ability of the thin layer to form each phosphor layer for emitting color, said process being improved by using as the phosphor particles those coated with at least one surface coating material selected from the group consisting of $Zn(OH)_2$, $Zn_3(PO_4)_2$ and $AlPO_4$.

The phosphors used in this invention should be coated with at least one material selected from the group consisting of $Zn(OH)_2$, $Zn_3(PO_4)_2$ and $AlPO_4$. In the case of coating the phosphors with $Zn(OH)_2$ or $Zn_3(PO_4)_2$, the phosphors may be undercoated with $SiO_2$ before coating of $Zn(OH)_2$ or $Zn_3(PO_4)_2$.

In this invention, when at least one color-emitting phosphor is coated as mentioned above among three kinds of phosphors which emit three colors individually, the effect of this invention can be admitted. But the most preferable embodiment of this invention is to coat all the three kinds of phosphors with such a material mentioned above.

Methods for coating the phosphors with the above-mentioned materials are disclosed in, for example, Japanese Patent Appln Kokoku (Post-Exam Publn) Nos. 43075/74 and 43076/74 and Japanese Patent Application No. 114365/78.

For example, when the phosphor is coated with $Zn_3(PO_4)_2$, the following method can be employed. To a prescribed amount of phosphor, an aqueous phosphate solution necessary for the surface treatment previously determined is added and the resulting suspended mixture is warmed to about 30° to about 60° C. with stirring for several tens minutes. Subsequently an aqueous solution of a zinc salt containing zinc ions in stoichiometrically equivalent amount or 2 to 3 times in excess comparing with the amount of the phosphate group in the mixture is added to the mixture and the pH of the system is adjusted to about 4 to 9 with stirring for several minutes and thereafter the resulting mixture is allowed to stand for about 1 hour. Thus the phosphor substantially coated with zinc phosphate can be obtained. The thus coated phosphor is taken out of the water, washed with water and dried to give a surface treated phosphor.

As the aqueous solution of phosphate salt, it is preferable to use an about 10% aqueous solution of phosphoric acid, or water soluble sodium or potassium phosphate, either monobasic, dibasic or tribasic. As the aqueous solution of a zinc salt, it is preferable to use an about 10% aqueous solution of zinc sulfate, zinc nitrate, and the like.

When the phosphor is coated with aluminum phosphate, the following method can be employed. A phosphor is suspended in water, and an aqueous solution of phosphoric acid or sodium phosphate in an amount necessary for the surface treatment depending on the object is added to the suspension. After stirring about 30 minutes, there is added with stirring an aqueous solution of aluminum salt containing about stoichiometrically equivalent amount of aluminum ions to the suspension to deposit insoluble aluminum phosphate on the phosphor. In such a case, it is preferable to warm the suspension to 30° to 60° C. After the addition of the aqueous solution of aluminum salt, pH of the system is adjusted to 4 to 7 and the system is allowed to stand for about 30 minutes. The resulting phosphor is filtered, washed with water and dried to give the surface-treated phosphor. As the aqueous solution of aluminum salt, it is preferable to use an aqueous solution of aluminum sulfate, aluminum nitrate, or aluminum chloride.

When the phosphor is coated with $Zn(OH)_2$, the following method can be employed. To an aqueous suspension of a phosphor, an aqueous solution of zinc salt such as $ZnSO_4$, $Zn(NO_3)_2$, $Zn(CH_3COO)_2$, etc. is added and pH of the system is adjusted to 8 to 11 using ammonia water or an aqueous solution of a caustic alkali with stirring. $Zn(OH)_2$ is deposited on the phosphor to cover the phosphor surface. The $Zn(OH)_2$ coated phosphor is separated, washed with water and dried.

In the case of undercoating $SiO_2$ previously, water glass is mixed with an aqueous suspension of a phosphor, and an aqueous solution containing multivalent cations such as $ZnSO_4$, etc. is added to the mixture with stirring to give the phosphor undercoated with $SiO_2$. The resulting mixture is allowed to stand for about 1 hour, and the precipitate is washed with water by decantation, and dried. Thereafter, the resulting pretreated phosphor is coated with $Zn(OH)_2$ or $Zn_3(PO_4)_2$ in the same manner as mentioned above.

Coated amount of the surface coating material on the phosphor can be determined as follows: in the case of $Zn(OH)_2$, it is dissolved as an ammonium complex and determined; in the case of $Zn_3(PO_4)_2$ or $AlPO_4$, it is dissolved with an acid and the resulting phosphate group is determined by a known method.

The amount of the surface coating material for coating the phosphor used in this invention is preferably in the range of 0.01 to 2% by weight based on the weight of the phosphor (hereinafter, percent by weight is used in the same basis). Particularly, in the case of $SiO_2$ for undercoating and $AlPO_4$, the range of 0.05 to 1% by weight is more preferable. In the case of $Zn(OH)_2$, the range of 0.01 to 0.7% by weight is more preferable, and in the case of $Zn_3(PO_4)_2$, the range of 0.05 to 1.5% by weight is more preferable.

If the amount of the material coated on the phosphor is less than 0.01% by weight, the effect of the coating is not considerably obtainable. In the case of $SiO_2$, $Zn_3(PO_4)_2$ and $AlPO_4$, remarkable effect of the coating can be obtained when the phosphor is coated by them in an amount of 0.05% by weight or more. On the other hand, if the amount of the material coated on the phosphor is too large, brightness of the phosphor is lowered. Therefore, the amount of 2% by weight or less is preferable. In the case of $SiO_2$ and $AlPO_4$, the amount of 1% by weight or less is more preferable, while in the case of $Zn_3(PO_4)_2$, the amount of 1.5% by weight or less is more preferably by the same reason as mentioned above. In the case of $Zn(OH)_2$, since the phosphor shows a tendency to lower its brightness over 0.7% by weight, the amount of 0.7% by weight or less is more preferable.

Any kind of phosphors can be used in this invention. For example, as the red-emitting phosphors, there can be used $Y_2O_2S$: Eu; $Y_2O_3$: Eu; $Gd_2O_2S$: Eu; etc., as the green-emitting phosphors, ZnS:Cu,Al; (ZnCd)S:Cu,Al; ZnS:Au,Cu,Al; ZnS:Au,Al; $Gd_2O_2S$:Tb; $Y_2O_2S$:Tb; $La_2O_2S$:Tb; etc. and as the blue-emitting phosphors, ZnS:Ag,Cl; ZnS:Ag,Al; ZnS:Tm; etc.

In more preferable embodiment, some kind of phosphors require a special kind of the surface coating material for coating the phosphors. That is, it is preferable to use $Zn(OH)_2$ for coating blue-emitting phosphors, it is preferable to use $Zn(OH)_2$ with undercoating of $SiO_2$ for coating red-emitting phosphors; and it is preferable to use $Zn(OH)_2$ or $Zn_3(PO_4)_2$ for coating green-emitting phosphors As the aromatic diazonium salts used in this invention, those described in Japanese Patent Appln Kokai (Laid-Open) No. 126861/78 can be used. For example, there can be used aromatic diazonium chloride, zinc chloride double salts such as 4-dimethylaminobenzene diazonium chloride, zinc chloride double salt; 4-diethylaminobenzene diazonium chloride, zinc chloride double salt; 4-(N-ethyl-N-hydroxyethylamino)benzene diazonium chloride, zinc chloride double salt; etc.; 4-nitronaphthalene diazonium chloride, zinc chloride double salt; aromatic diazonium tetrafluoroborates such as 4-dimethylaminobenzene diazonium fluoborate, 2-methoxybenzene diazonium fluoborate, etc.; aromatic diazonium sulfates such as 4-dimethylaminobenzene diazonium sulfate, 4-(phenylamino)benzene diazonium sulfate, etc.; and the like.

The thin layer is formed on the inner surface of the face plate of a color picture tube by coating a photosensitive composition containing an aromatic diazonium salt or a mixture of an aromatic diazonium salt as a photosensitive component thereon. In such a case, in order to improve coating processability, the photosensitive composition can contain one or more organic polymeric materials and/or surface active agents. Preferred examples of the organic polymeric materials are gum arabic, polyvinyl alcohol, polyacrylamide, poly(N-vinylpyrrolidone), hydroxypropylmethylcellulose, alginic acid, propylene glycol ester of alginic acid, a copolymer of acrylamide and diacetone-acrylamide, a copolymer of methyl vinyl ether and maleic anhydride, and the like. The organic polymeric material can preferably be used in an amount of 0.5 to 500% by weight based on the weight of the aromatic diazonium salt.

As mentioned above, the phosphor particles thus treated according to this invention are excellent in flow characteristics, wetting characteristics, and the like, so that there can be obtained excellent results such as the phosphors being able to be adhered to the whole surface of the phosphor screen uniformly, and quickly with a sufficient amount, and cross contamination of phosphor and fog of unexposed areas being not observable.

The phosphor coating layer thus formed can be interlocked by contacting with ammonia gas as disclosed in Japanese Patent Appln Kokai (Laid-Open) No. 126861/78.

Further, pigment-coated phosphors are recently used for producing color picture tubes having high color contrast. These phosphors can also be used in the present invention by coating them with the surface coating material.

This invention will be illustrated by way of the following Examples, in which all parts and percents are by weight unless otherwise specified.

EXAMPLE 1

Three kinds of surface treated phosphors were prepared as follows: red-emitting phosphor $Y_2O_2S:Eu$ having an average particle size of 8.1 μm was undercoated with 0.06% of $SiO_2$ followed by coating of 0.06% of $Zn(OH)_2$, green-emitting phosphor $ZnS:Cu,Al$ having an average particle size of 12.2 μm was coated with 0.15% of $Zn_3(PO_4)_2$ and blue-emitting phosphor $ZnS:Ag, Cl$ having an average particle size of 9.4 μm was coated with 0.24% of $Zn(OH)_2$ by the following method.

A water glass containing 15% of $SiO_2$ was mixed with an aqueous suspension of the red-emitting phosphor, and an aqueous solution of $ZnSO_4$ was added to the mixture with stirring. The phosphor was washed with water by decantation and added to an aqueous solution of $ZnSO_4$, and pH of the system was adjusted to 9 with stirring. The phosphor was separated. washed with water and dried. The resulting phosphor was coated with $SiO_2$—$Zn(OH)_2$.

The green emitting phosphor was suspended to an aqueous solution of sodium phosphate, and an aqueous solution of $ZnSO_4$ was added to the suspended mixture with stirring. The phosphor was separated, washed with water and dried. The resulting phosphor was coated with $Zn_3(PO_4)_2$.

In the next place, an aqueous solution having the following Composition 1 was coated on the face plate of a color picture tube by means of the spin coating method and dried by infrared heating to form a photosensitive thin layer of 0.5 μm thick.

| Composition 1 | |
|---|---|
| 4-Dimethylaminobenzene diazonium chloride, zinc chloride double salt | 1 part |
| Surface active agent (a condensate of sodium naphthalene sulfonate and formaldehyde, Demor MS, a trade name manufd. by Kao-Atlas Co., Ltd.) | 0.01 part |
| Water | 20 parts |

The photosensitive thin layer was irradiated with light from an ultra-high pressure mercury lamp with an intensity of 50 mW/cm$^2$ through holes of a shadow mask for 1 minute. Subsequently, the surface of the photosensitive thin layer was coated with the surface treated blue-emitting phosphor by the dusting technique. That is, the phosphor particles were dusted over the surface of the thin layer and adhered to the portions of the thin layer which had been exposed to the light, and the remaining phosphor particles were removed by an air spray to give an imagewise blue-emitting phosphor layer. A sufficient amount of the blue-emitting phosphor was adhered to the thin layer uniformly with a remarkably short time of contact between the phosphor and the thin layer.

Subsequently, different non-exposed portions of the photosensitive thin layer other than the previously exposed portions were irradiated with light from the ultra-high pressure mercury lamp again in the same manner as mentioned above and the surface treated green-emitting phosphor was coated on the thus treated surface of the thin layer by dusting in the same manner as mentioned above.

Further, in the same manner as mentioned above, different non-exposed portions of the photosensitive thin layer other than those previously exposed were irradiated with the light and the surface treated red-emitting phosphor was coated thereon by dusting.

The resulting phosphor screen of the color picture tube showed the same excellent level as that obtained by the slurry process now widely used in the art in the cross contamination of phosphor, fog of unexposed areas and the amount of phosphors coated.

For comparison, the same procedures as mentioned above were repeated except for using phosphors the surfaces of which had not been treated in place of the surface treated phosphors with the results that the amounts of the three kinds of phosphors coated were about one-third of those in Example 1 mentioned above, respectively, when the same contact time was employed.

EXAMPLE 2

The procedures of Example 1 were repeated by using surface treated phosphors as listed in Table 1. Sufficient amounts of the surface treated phosphors were coated almost uniformly on the phosphor screen of the color picture tube as in Example 1 even if the contact time between the phosphors and the thin layer was remarkably short.

TABLE 1

| Phosphor | Average particle size (μm) | Surface coating material | Surface coating amount (%) |
|---|---|---|---|
| $Y_2O_2S:Eu$ | 8.5 | $Zn(OH)_2$ | 0.15 |
| " | 8.3 | $Zn_3(PO_4)_2$ | 0.29 |
| " | 8.5 | $AlPO_4$ | 0.24 |
| " | 8.1 | $SiO_2$—$Zn(OH)_2$ | 0.54, 0.50 |
| " | 8.6 | $SiO_2$—$Zn_3(PO_4)_2$ | 0.11, 0.31 |
| $ZnS:Cu, Al$ | 10.7 | $Zn(OH)_2$ | 0.18 |
| " | 12.2 | $Zn_3(PO_4)_2$ | 0.14 |
| " | 13 | $AlPO_4$ | 0.24 |
| " | 12.5 | $SiO_2$—$Zn(OH)_2$ | 0.22, 0.20 |
| " | 10.8 | $SiO_2$—$Zn_3(PO_4)_2$ | 0.19, 0.30 |
| $ZnS:Ag, Cl$ | 9.4 | $Zn(OH)_2$ | 0.24 |
| " | 11.6 | $Zn_3(PO_4)_2$ | 0.18 |
| " | 14 | $AlPO_4$ | 0.1 |
| " | 6.3 | $SiO_2$—$Zn(OH)_2$ | 0.19, 0.20 |
| " | 10.8 | $SiO_2$—$Zn_3(PO_4)_2$ | 0.19, 0.30 |

EXAMPLE 3

Almost the same results as obtained in Example 1 were obtained by repeating the procedures as mentioned in Example 2 except for using as a red-emitting phosphor $Y_2O_3:Eu$, $La_2O_2S:Eu$ or $Gd_2O_2S:Eu$ in place of $Y_2O_2S:Eu$, as a green-emitting phosphor $(Zn,Cd)S:Cu,Al$, $ZnS:Au,Cu,Al$, $Gd_2O_2S:Tb$, $Y_2O_2S:Tb$ or $La_2O_2S:Tb$ in place of $ZnS:Cu,Al$ and as a blue-emitting phosphor $ZnS:Ag,Al$ in place of $ZnS:Ag,Cl$.

EXAMPLE 4

The procedures of Example 1 were repeated by using one of Compositions 2 to 10 in place of Composition 1.

Almost the same results as obtained in Example 1 were obtained in each case.

Composition 2

| | |
|---|---|
| 4-Dimethylaminobenzene diazonium fluoborate | 3 parts |
| Polyvinyl alcohol | 10 parts |
| Water | 300 parts |

Composition 3

| | |
|---|---|
| 4-Nitronaphthalene diazonium chloride, zinc chloride double salt | 1 part |
| Polyvinyl alcohol | 2 parts |
| Water | 60 parts |

Composition 4

| | |
|---|---|
| 4-(Phenylamino)benzene diazonium sulfate | 1 part |
| Water | 20 parts |

Composition 5

| | |
|---|---|
| 4-(Phenylamino)benzene diazonium sulfate | 1 part |
| Gum arabic | 3 parts |
| Water | 60 parts |

Composition 6

| | |
|---|---|
| 4-Dimethylaminobenzene diazonium chloride, zinc chloride double salt | 1 part |
| Polyvinyl alcohol | 0.1 part |
| Water | 24 parts |

Composition 7

| | |
|---|---|
| 4-Dimethylaminobenzene diazonium fluoborate | 1 part |
| Poly(N-vinylpyrrolidone) | 3 parts |
| Water | 60 parts |

Composition 8

| | |
|---|---|
| 4-Dimethylaminobenzene diazonium chloride, zinc chloride double salt | 4 parts |
| Methyl vinyl ether-maleic anhydride copolymer | 0.8 part |
| Surface active agent (sodium lauryl sulfate) | 0.016 part |
| Water | 95.184 parts |

Composition 9

| | |
|---|---|
| 4-Dimethylaminobenzene diazonium chloride, zinc chloride double salt | 4 parts |
| Methyl vinyl ether-maleic anhydride copolymer | 0.2 part |
| Hydroxypropyl-methylcellulose | 0.2 part |
| Surface active agent (oxyethylene-oxypropylene block polymer) | 0.008 part |
| Water | 95.592 parts |

Composition 10

| | |
|---|---|
| 4-Dimethylaminobenzene diazonium chloride, zinc chloride double salt | 5 parts |
| Alginic acid propylene glycol ester | 0.5 part |
| Surface active agent (propylene glycol-ethylene oxide block copolymer) | 0.01 part |
| Water | 94.49 parts |

In this invention, two or more phosphors coated with different materials can be used in the form of a mixture, for example, a mixture of green-emitting phosphor coated with $Zn(OH)_2$ and that coated with $Zn_3(PO_4)_2$ and the like can be used effectively.

What is claimed is:

1. In a process for forming a phosphor screen of a color picture tube by a dry phosphor deposition method comprising coating a photosensitive composition, which contains an aromatic diazonium salt or a mixture of an aromatic diazonium salt as a photosensitive component and produces tackiness by exposure to actinic light, on the inner surface of the face plate of a color picture tube to form a thin layer, exposing the thin layer imagewisely to actinic light for producing tackiness on the portions exposed, contacting the exposed thin layer with phosphor particles, and making the thin layer receive the phosphor particles depending on receptive ability of the thin layer to form each phosphor layer for emitting color, the improvement which comprises using as the phosphor particles those coated with at least one surface coating material selected from the group consisting of $Zn(OH)_2$, $Zn_3(PO_4)_2$ and $AlPO_4$, whereby the amount of time necessary for the phosphor to contact the thin layer to provide said each phosphor layer thereon is shortened.

2. A process according to claim 1, wherein the surface coating material is $Zn(OH)_2$ and phosphor particles are undercoated with $SiO_2$ followed by coating with $Zn(OH)_2$.

3. A process according to claim 1, wherein the surface coating material is $Zn_3(PO_4)_2$ and phosphor particles are undercoated with $SiO_2$ followed by coating with $Zn_3(PO_4)_2$.

4. A process according to claim 1, 2 or 3, wherein the surface coating material is coated on the phosphor in an amount of 0.01 to 2% by weight based on the weight of the phosphor.

5. A process according to claim 1 or 2, wherein the surface coating material is $Zn(OH)_2$, which is used in an amount of 0.01 to 0.7% by weight based on the weight of the phosphor.

6. A process according to claim 1 or 3, wherein the surface coating material is $Zn_3(PO_4)_2$, which is used in an amount of 0.05 to 1.5% by weight based on the weight of the phosphor.

7. A process according to claim 1, wherein the surface coating material is $AlPO_4$, which is used in an amount of 0.05 to 1% by weight based on the weight of the phosphor.

8. A process according to claim 2 or 3, wherein the amount of $SiO_2$ for undercoating is 0.05 to 1% by weight based on the weight of the phosphor.

9. A process according to claim 1, wherein the phosphor is a blue-emitting phosphor and the surface coating material is $Zn(OH)_2$.

10. A process according to claim 9, wherein the amount of $Zn(OH)_2$ is 0.01 to 0.7% by weight based on the weight of the blue-emitting phosphor.

11. A process according to claim 1, wherein the phosphor is a red-emitting phosphor undercoated with $SiO_2$ and the surface coating material is $Zn(OH)_2$.

12. A process according to claim 11, wherein the amount of $SiO_2$ is 0.05 to 1% by weight based on the red-emitting phosphor and the amount of $Zn(OH)_2$ is 0.01 to 0.7% by weight based on the weight of the red-emitting phosphor.

13. A process according to claim 1, wherein the phosphor is a green-emitting phosphor and the surface coating material is $Zn(OH)_2$ or $Zn_3(PO_4)_2$.

14. A process according to claim 13, wherein the amount of $Zn(OH)_2$ is 0.01 to 0.7% by weight based on the weight of the green-emitting phosphor.

15. A process according to claim 13, wherein the amount of $Zn_3(PO_4)_2$ is 0.05 to 1.5% by weight based on the weight of the green-emitting phosphor.

16. A process according to claim 1, wherein the process comprises the steps of coating a photosensitive composition, which contains an aromatic diazonium salt or mixture of an aromatic diazonium salt as a photosensitive component and produces tackiness by exposure to actinic light, on the inner surface of the face plate to form a thin layer,
(1) exposing the thin layer imagewisely to actinic light to produce tackiness over the portions exposed, contacting the resulting thin layer with blue-emitting phosphor particles coated with $Zn(OH)_2$, making the exposed portions receive the surface treated blue-emitting phosphor particles, and removing superfluous blue-emitting phosphor particles from the thin layer,
(2) exposing secondly the non-exposed portions of the thin layer imagewisely to actinic light to produce tackiness over the portions exposed, contacting the resulting thin layer with green-emitting phosphor particles coated with $Zn(OH)_2$ or $Zn_3(PO_4)_2$ or a mixture of the two, making the secondly exposed portions receive the surface treated green-emitting phosphor particles, and removing superfluous green-emitting phosphor particles from the thin layer, and
(3) exposing thirdly the non-exposed portions of the thin layer imagewisely to actinic light to produce tackiness over the portions exposed, contacting the resulting thin layer with red-emitting phosphor particles undercoated with $SiO_2$ followed by coating with $Zn(OH)_2$, making the thirdly exposed portions receive the surface treated red-emitting phosphor particles, and removing superfluous red-emitting phosphor particles from the thin layer.

17. A process according to claim 1, wherein the coated phosphor particles are dried prior to the exposed thin layer being contacted with the coated phosphor particles, whereby the exposed thin layer is contacted with phosphor particles which are in a dried state.

18. A process according to claim 16, wherein the photosensitive composition includes at least one material selected from the group consisting of organic polymeric materials and surface active agents.

19. A process according to claim 18, wherein the organic polymeric material is selected from the group consisting of gum arabic, polyvinyl alcohol, polyacrylamide, poly(N-vinylpyrrolidone) hydroxypropylmethylcellulose, alginic acid, propylene glycol ester of alginic acid, a copolymer of acrylamide and diacetoneacrylamide, and a copolymer of methyl vinyl ether and maleic anhydride.

20. A process according to claim 18, wherein the organic polymeric material is used in an amount of 0.05 to 500% by weight based on the weight of the aromatic diazonium salt.

21. A process according to claim 1, wherein the phosphor particles which are coated with said at least one surface coated material are pigment-coated phosphor particles.

22. A process according to claim 1, wherein said phosphor particles comprise a mixture of phosphor particles coated with different surface coating materials.

* * * * *